(12) United States Patent
Arconati et al.

(10) Patent No.: US 9,734,487 B2
(45) Date of Patent: Aug. 15, 2017

(54) USEFUL DATA AND CONTENT FEEDS IN THE ENTERPRISE

(75) Inventors: William Vincent Arconati, Kentfield, CA (US); Jonathan Michael Hurley, East Windsor, NJ (US); Alan Brett Gilbert, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1027 days.

(21) Appl. No.: 12/208,032

(22) Filed: Sep. 10, 2008

(65) Prior Publication Data

US 2009/0222527 A1  Sep. 3, 2009

Related U.S. Application Data

(60) Provisional application No. 61/033,265, filed on Mar. 3, 2008.

(51) Int. Cl.
| | |
|---|---|
| *G06F 15/16* | (2006.01) |
| *G06Q 10/10* | (2012.01) |
| *G06F 21/31* | (2013.01) |
| *H04L 12/58* | (2006.01) |
| *H04L 29/08* | (2006.01) |
| *H04L 29/06* | (2006.01) |

(52) U.S. Cl.
CPC .......... *G06Q 10/107* (2013.01); *G06F 21/31* (2013.01); *H04L 51/24* (2013.01); *H04L 67/26* (2013.01); *H04L 63/08* (2013.01)

(58) Field of Classification Search
CPC .................................................. G06F 17/3089
USPC ....................................................... 709/206
See application file for complete search history.

(56) References Cited

U.S. PATENT DOCUMENTS

| | | | |
|---|---|---|---|
| 6,564,243 B1 | 5/2003 | Yedidia | |
| 6,617,969 B2 | 9/2003 | Tu | |
| 6,631,363 B1 | 10/2003 | Brown | |
| 6,934,955 B2 | 8/2005 | Nickum | |
| 6,983,362 B1 * | 1/2006 | Kidder ................ | G06F 11/0709 707/999.002 |
| 7,010,581 B2 | 3/2006 | Brown | |
| 7,107,526 B1 | 9/2006 | Weller | |
| 7,155,514 B1 | 12/2006 | Milford | |
| 2004/0205567 A1 | 10/2004 | Nielsen | |
| 2007/0038718 A1 * | 2/2007 | Khoo et al. ................... | 709/206 |
| 2007/0100960 A1 * | 5/2007 | Eichstaedt et al. ........... | 709/217 |
| 2007/0282959 A1 * | 12/2007 | Stern .............................. | 709/206 |
| 2008/0005125 A1 | 1/2008 | Gaedeke | |
| 2008/0016164 A1 * | 1/2008 | Chandra ....................... | 709/206 |

(Continued)

FOREIGN PATENT DOCUMENTS

| | | |
|---|---|---|
| WO | WO03003700 | 1/2003 |
| WO | WO2008073812 | 6/2008 |

OTHER PUBLICATIONS

O'Reilly Media, "Notification Services", 5 pages, MS SQL Server. Retrieved on Nov. 6, 2008, http://www.aspfree.com/c/a/MS-SQL-Server/Notification-Services/.

(Continued)

*Primary Examiner* — Hua Fan
(74) *Attorney, Agent, or Firm* — Kilpatrick Townsend & Stockton LLP

(57) ABSTRACT

In a new Notification Service, applications can publish data and allow users to subscribe to that data how they wish, with methods for secure redaction and secure authentication.

32 Claims, 11 Drawing Sheets

(56) References Cited

U.S. PATENT DOCUMENTS

| | | |
|---|---|---|
| 2008/0126884 A1 | 5/2008 | Stempfer |
| 2008/0148383 A1 | 6/2008 | Pitchaikani |
| 2008/0218318 A1 | 9/2008 | Boss |
| 2008/0235671 A1 | 9/2008 | Kellogg |
| 2009/0164878 A1* | 6/2009 | Cottrille .................. 715/210 |
| 2010/0241711 A1* | 9/2010 | Ansari et al. ............ 709/205 |

OTHER PUBLICATIONS

Expressminds, 2 pages. Retrieved on Nov. 6, 2008, http://www.expressminds.net/services.html.

Nitroview Logcaster, "Compliant Log Collection, Storage and Management, 3 pages. Retrieved on Nov. 6, 2008, http://nitrosecurity.com/products/nitroview/logcaster/.

Logmeister, "Log Reader With Monitoring & Alerting Capability", 2008, 3 pages. Retrieved on Nov. 6, 2008, http://www.tlhouse.co.uk/LogMeister/logmeister_info.shtml.

XEP-0021: Jabber Event Notification Service (ENS), "A Generic Publish-and-Subscribe Service for Jabber", 11 pages. Retrieved on Nov. 6, 2008, http://xmpp.org/extensions/xep-0021.html.

MAC-OS X Hints "Growl—An Event Notification System" 3 pages. Retrieved on Nov. 6, 2008, http://www.macosxhints.com/article.php?story=20070926092609653.

Gruber, et al., "High-Level Constructs in the READY Event Notification System", 8 pages. Retrieved on Nov. 6, 2008, http://reference.kfupm.edu.sa/content/h/i/high_level_constructs_in_the_ready_event_1242795.pdf.

Drury, "The CORBA Notification Service: JacORB and TAO Interoperability", Jun. 2002, 12 pages. Retrieved on Nov. 6, 2008, http://www.ociweb.com/cnb/CORBANewsBrief-200206.html.

Forbes.com, "Enea Announces Enhanced Alarm and Notification Services for Enea Element Middleware", Oct. 21, 2008, 3 pages. Retrieved on Nov. 6, 2008, http://www.forbes.com/businesswire/feeds/businesswire/2008/10/21/businesswire20081021005520r1.html.

Simon, et al., "WebSphere Everyplace Access Intelligent Notification Service Part 1: Setting up and Configuring Components", Nov. 20, 2003, 8 pages. Retrieved on Nov. 6, 2008, http://www-128.ibm.com/developerworks/websphere/library/techarticles/0311_patterson/patterson1.html.

Frsirt, "Security Alerting and Vulnerability Management Solutions", 2 pages, Retrieved on Nov. 6, 2008, http://www.frsirt.com/english/services/.

Mircosoft, "Notification Services in SQL Server 2005", 2005, 2 pages. Retrieved on Nov. 6, 2008, http://www.microsoft.com/Sqlserver/2005/en/us/notification-services.aspx#resources.

Nuxeo, "User Notification Service", 2 pages. Retrieved on Nov. 6, 2008, http://www.nuxeo.com/en/products/sp/user-notification/.

Pilgrim, "Dive Into Grease Monkey", 2005, 4 pages. Retrieved on Nov. 6, 2008, http://diveintogreasemonkey.org/toc/index.html.

Manalang, "Introducing MonkeyGrease: The Server-Side Greasemonkey", Nov. 8, 2005, 4 pages. Retrieved on Nov. 6, 2008, http://www.theserverside.com/news/thread.tss?thread_id=37475.

* cited by examiner

USEFUL DATA AND CONTENT FEEDS IN THE ENTERPRISE

CLAIM OF PRIORITY

This application claims priority to U.S. Provisional Application No. 61/033,265 entitled "USEFUL DATA AND CONTENT FEEDS IN THE ENTERPRISE" by Bill Arconati, et al., filed Mar. 3, 2008 which is hereby incorporated by reference.

SUMMARY

In a Notification Service, applications can publish data and allow users to subscribe to that data how they wish, with methods for secure redaction and secure authentication.

DETAILED DESCRIPTION

Figure 1:
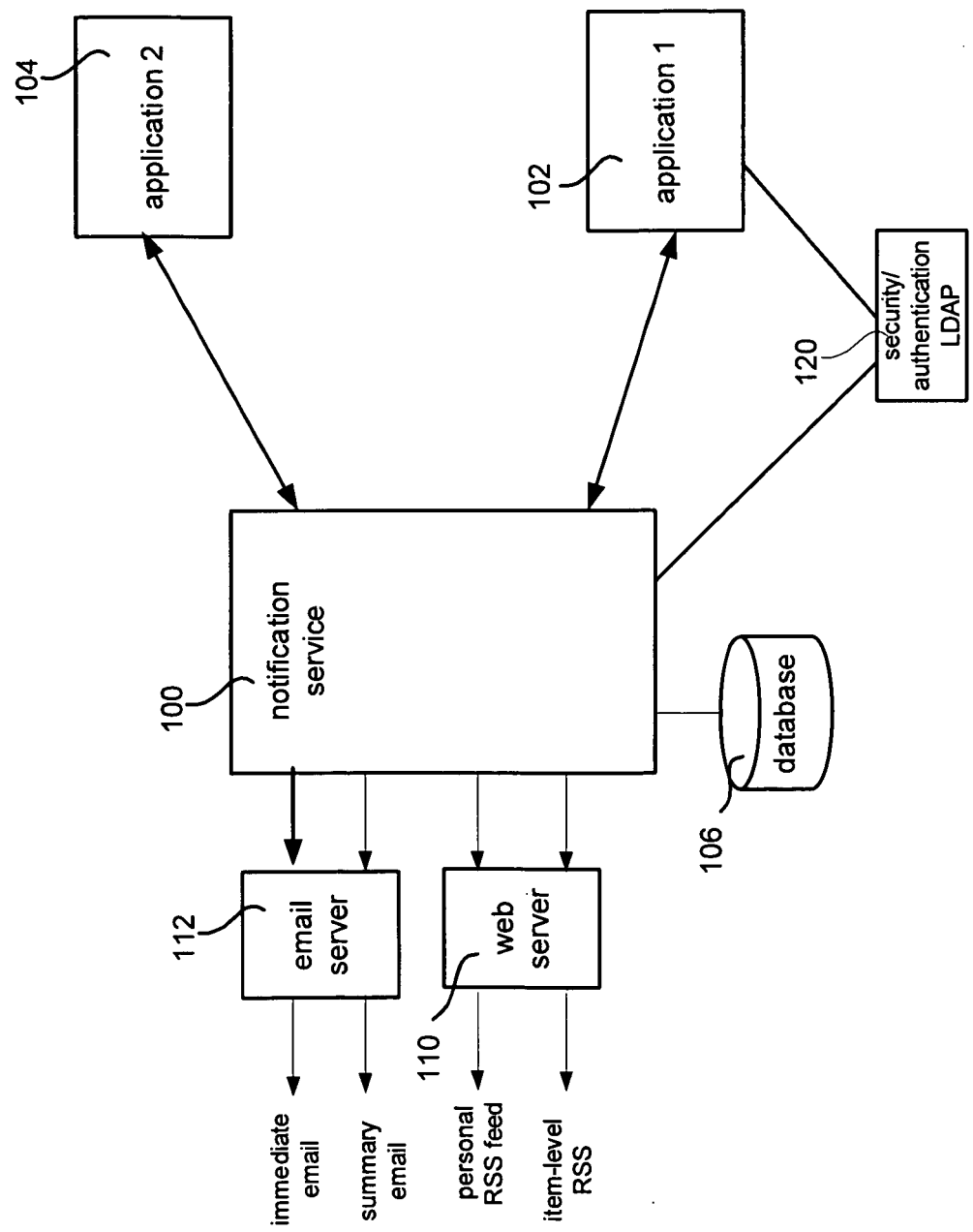
FIG. 1 shows a diagram of a notification service.
Figure 2:
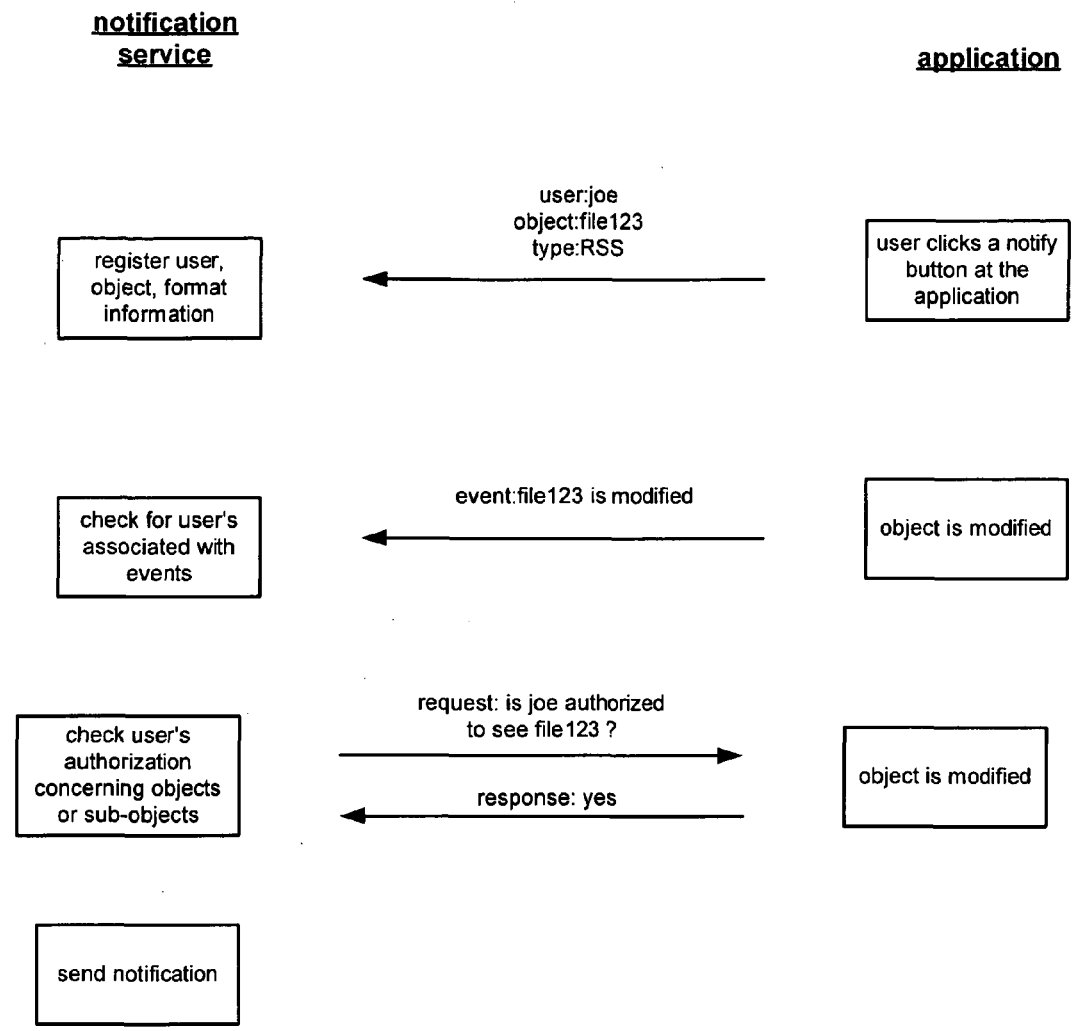
FIG. 2 shows a diagram illustrating an example.
Figure 3:
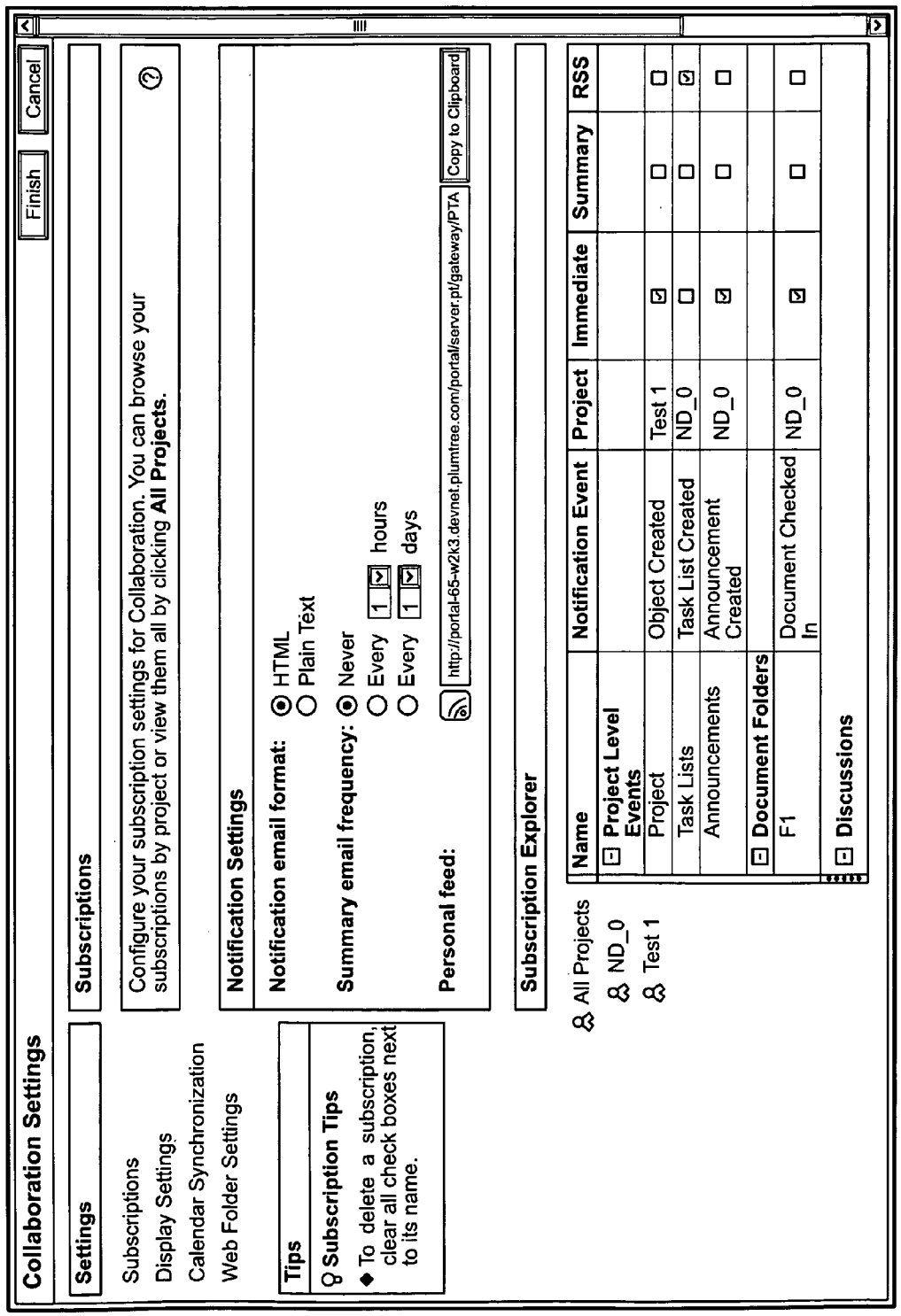
FIG. 3 shows a diagram illustrating.
Figure 4:
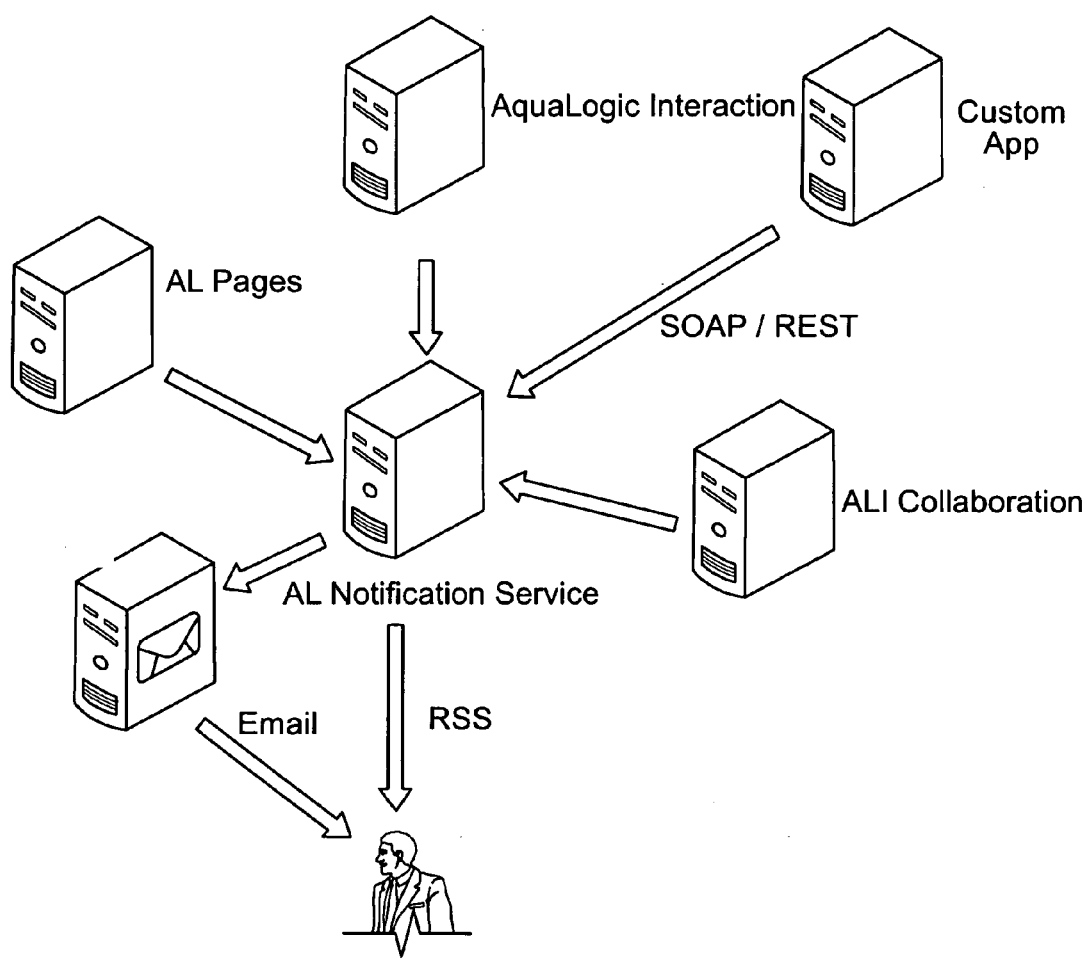
FIG. 4 shows another diagram of a notification service.

FIG. 1 shows a notification service 100. The notification service 100 can interact with applications 102 and 104 to provide notifications to users. The notification service 100 can be independent from the applications 102 and 104 and can use its own database 106. The notification service 100 can provide notifications in different formats. The formats can include RSS feeds and/or emails.

The RSS feeds can include a personal feed for all of a user's notifications and/or a item-level RSS feed for updates to specific objects.

The email notifications can include immediate emails and summary emails. The period of the summary emails can be user specified.

The RSS feeds can be provided by a web server 110 associated with the notifications service 100. The emails can be sent by a email server 112 associated with the notification service 100.

Security, such as through a LDAP (Lightweight Directory Access Protocol) server 120, can also be provided.

In one embodiment, the notification service 100 can be used by an application, such as application 102, to allow a user to get notifications about objects, such as files or other data, at the application.

The notification service 100 can provide an API to register for notifications. The registration can include a user name, the object name and the desired format of the registration. For example, the application can provide a button that a user can select to register for a notification. The notification service 100 can store the registration information into database 106.

The Notification Service doesn't register user names or object names specifically—it is keyed off of a unique ID, such as a UUID or a user name.

For example, the object may include sub-objects for which the user does not have authority to see. The notification service 100 can check back with the application to determine the user's authentications.

In one embodiment, when sending an email-based notification, the Notification Service does not check back with the consuming application to verify security. It can be up to the consuming application to request the recipient list, and filter the list in order to provide a subset of recipients for the Notification Service to send to. RSS feed redaction; however, can automatically call back to the consumer.

In one embodiment, applications send events indicating changes of objects at the applications. The notification service can interpret the events to determine which users should be sent notifications concerning which events. A notification can be sent to at least one of the users according to a format selected by the at least one of the users. The format selected can be from a set including email and RSS.

The RSS notifications can have user security. The RSS notifications can use basic authentication with user name and password or use tokens in a single sign-on system.

The notification service can use authentication before providing the RSS feed, the authentication can include checking for single sign on token and if none is provided, requesting a user name and password.

The RSS feed can have an URL for changes to an object of a personal RSS feed giving all of the individual users notifications.

The notification service can construct a redacted RSS feed by checking with the application to determine the authority of a user to receive information about the object.

The notification server 100 can check for the authentication of a user concerning the object associated with the event; and create a notification when there is authorized update information.

The Notification Service can provide "reliable messaging". One an event is sent by a consumer, the consumer is guaranteed that the resulting message will be delivered tot recipients, even if the service is restarted before the event could be processed.

In the following example, terms such as "must", "should" and the like concern the operation of an exemplary embodiment and should not be deemed required for all embodiments of the present invention.

One of the main features that a new notification service component can include is the ability to be consumed a variety of application products, not just collaboration. Notification technologies including E-mail, RSS, and Instant Messaging are various ways that other products may want to alert users of changes to data.

A generalized subscription management component that can be easily leveraged by several products at once. Consuming products can be able to utilize the notification service as a way to manage subscriptions and provide notifications to end-users of events that occur within the system. The coupling between objects and subscriptions can be kept to a minimum in order to provide a solution that can fit the different products.

The Notification Service can allow the notification type or types for a given subscription/subscriber to be changed. Changes to the notification type can allow users flexibility in terms of how they want to be notified of updates to subscriptions.

The Notification Service can change any of the stored values for a subscriber. Stored values can include:
  ID
  Plaintext or HTML
  Summary Notification Interval The Notification Service can clear persisted data related to notifications when the timer delay on the subscription has expired. Notifications can be emptied from the queue and the content can be compacted into a single piece of content that is sent via one notification to the subscriber. For example, a queue of 50 notifications can be received by the subscriber as a single notification that has the content of all queued entities.

The Notification Service can offer a set of notification type's out-of-the-box for consuming applications to use when specifying how subscribers should be contacted.

Notification types can be tightly coupled to specific business logic that enables the notification service to function properly. As a result, consuming applications are unable to dynamically add new notification types. In one embodiment, the following types can be offered:
  Email (Instant)
  Email (Summary)
  RSS (User-level)
  RSS (Object-level)

The Notification Service can provide a set of default subscription types that can be used with subscriptions created by consuming applications.

In one embodiment, the following are default subscription types that can be offered:
  Item Create
  Item Delete
  Item Create or Delete
  Item Update
  Saved Search Update
  View Update
  ANY
NONE In one embodiment, subscription types are dynamic and can be added by consumers to suite one's own needs.

The Notification Service can provide a mechanism for a consumer to send a bundle of properties and tokens in order for the Notification Service to generate content. The content in this requirement can be generated by the Notification Service.

This requirement can force the consuming application to adhere to the template language chosen by the Notification Service. The Notification Service can accept a set of common tokens (optional) and personal tokens (optional) for each subscriber for each subscription update.

The Notification Service can provide a mechanism for a consumer to include the time zone on a per-subscriber basis for content that is generated in the Notification Service.

The time zone can be used to render all dates that are generated dynamically for a subscriber in the subscriber's correct offset.

The Notification Service can provide a mechanism for sending different content to individual subscribers. The content in this requirement can be generated by the consumer.

Custom scenarios, such as experience definition (XD) support, can require that the notification service not be restricted in sending the same content to all subscribers of a subscription when that subscription is updated. Consuming applications can specify in a notification, on a per subscriber bases, the content that should be sent to each subscriber.

This feature can also be used to support locale and time-zones within notifications.

The Notification Service can allow a subscriber to have 1 to n notification types for any given subscription. Users may want to be notified in more than one way when an update to a subscription has occurred.

The Notification Service can be able to send notifications to recipients that are not subscribed to a subscription.

The Notification Service can accept a list of recipients, notification types, and content and can relay the content to the specified recipients. This can support the use-case of inviting users to collaboration projects and/or LiveSpaces/ DataSpaces to which they are not already subscribed. This feature can support inviting users to a community.

The Notification Service can be able to notify a collection of subscribers based solely on the subscription being updated.

Consuming applications can inform the notification service that a subscription has fired. It can be the responsibility of the notification service to determine the subscribers of the update.

The Notification Service can queue notifications that are sent for delayed subscriptions. Delayed subscriptions can be created on a per-subscriber basis and instruct the notification service to wait a fixed period of time before sending the content of the message.

Subscribers who have specified that one or more subscriptions be delayed can be assigned a queue of where notifications for any subscription with a delay can be stored until that subscriber's timer expires.

The Notification Service can provide both HTML and plaintext content to a subscriber a given notification.

A single notification containing multiple types of content can be preferable to two separate notifications encapsulating one type of content.

The Notification Service can send notifications via Email to a list of recipients or to an entire subscription.

In one embodiment, emailing recipients can be done either through an SMTP relay or through a specified mail domain. Mail can also be sent directly through Microsoft Exchange or Lotus Domino.

The Notification Service can consume applications the ability to specify a "reply-to" email address for email-based notifications.

The Notification Service should provide consuming applications the ability to specify a "reply-to" email address for email-based notifications. This is necessary in order to support the "email-a-project" feature in ALI Collaboration as well as any other applications that want similar functionality.

The Notification Service can publish any type of notification to an RSS feed.

Subscriptions can be able to be marked to be published to RSS. Items published to RSS can adhere to the RSS 2.0 standard and can contain text only.

The Notification Service can provide plaintext-only content for RSS notifications.

In order to comply with RSS 2.0 standards, plaintext can be used to send content via RSS. The plaintext content can be encoded to support character sets that are wide.

Consuming applications can create a subscription around any object in their system Objects are related to a subscription via a subscription type that describes an event around that object. For example, a consuming application can create a subscription that relates a folder to a creation event.

Consuming applications can be able to add new users to a subscription.

New users can be added to a subscription along with a notification type that determines how they want to be notified when subscriptions are updated.

Consuming applications can be able to remove users from a subscription.

Users that wish to unsubscribe from a subscription can be allowed to do so without corrupting the remaining information in that subscription.

The Notification Service can be able to allow consuming applications to retrieve the subscriptions that a given subscriber is associated with.

This feature can be provided for consuming applications to be able to provide a "Manage my Subscriptions" UI. The notification service can provide a mechanism for retrieving the subscriptions of a given subscription in order for a consuming application to display that information. The following pieces of data can be retrievable for any subscriber:

Subscription ID
Subscription type
Subscribed object ID
Notification Type

In one embodiment, in addition to the static pieces of content listed that comprise a subscription, consumers can decorate subscriptions with searchable metadata in order to assist in retrieving and organizing subscriptions in an UI.

The Notification Service can be able to allow subscribers to specify their preferred type of notification content for Email messages.

Email messages can be rich in content or lightweight. Subscribers can be associated with their preference for the type of content they wish to receive.

The Notification Service can store certain subscriber information.

By default, it can support:
preference for plaintext or HTML content
unique subscriber ID
summary notification frequency Other subscriber information can be retrieved by the Notification Service through a security framework that is designed to provide a flexible backend to multiple data sources.

The Notification Service can use a security service such as ALI security in order to connect to any backend LDAP provider for all of its security needs.

In one embodiment, the only data source supported with the Portal with the Security and Directory Service. The Notification Service need not persist subscriber data such as email, name, etc.

The Notification Service can provide a collection of subscribers for a given subscription.

Consuming applications can need to generate specific content for each subscriber of a subscription and can need a way to query the notification service for a collection of subscribers.

The Notification Service can have the ability to turn on or off the RSS publish flag of a subscription without changing the information stored for that subscription.

Consuming applications can enable or disable RSS publishing of a subscription at can due to popularity or data sensitivity.

The Notification Service can provide a mechanism for adding a delivery delay on a per subscriber basis that can delay the delivery of any subscription with a notification type of "Email-Summary".

Subscribers may not want to be notified immediately of an update to a subscription they are subscribed to. Instead, they may choose to receive a queued list of notifications at a regular interval. Subscription information for a subscriber can include one of the following delays:

None: no delay, so notifications are process immediately.
Hourly: a delay of every n hours starting from the next hour.
Daily: a delay of 24 hours from a specified hour (every day at 3 PM)

The Notification Service can provide an RSS feed for each subscriber that contains a summary of all of the subscription updates for that subscriber. In one embodiment, only subscriptions that are RSS enabled can be published to the subscriber's summary RSS feed. The feed can be specific to a particular consuming application.

When a notification is pushed for a subscription, the Notification Service can update the personal feeds of each subscriber if the subscription has RSS enabled. These summary feeds allow a subscriber to be able to pull subscription updates into their RSS aggregator without the need for micro-managing each subscription.

The Notification Service can allow the client application to store client-specific metadata on a subscription. In one embodiment, there is no fixed limit to the amount of content that can be stored. Metadata can be available to retrieve on subscriptions that are returned by the Notification Service.

The ability for the client to add metadata to an otherwise generic subscription can reduce the overhead on the client of trying to figure out how to organize and categories returned subscriptions. Subscriptions can have the ability to store 0 to n pieces of metadata and can be optional.

The Notification Service can restrict the result set of a subscription query based on a client-defined restriction or chain of restrictions. In other words, it can support querying based on custom metadata. The restrictions can be applied to the metadata of a subscription, if any exist.

Clients may want to only retrieve particular subscriptions that match a given set of criteria. This can prevent the client application from the need to retrieve all subscriptions, and then sort them in-memory.

The Notification Service can be able to protect RSS feeds with basic authentication in order to prevent unauthorized access to feeds that contain sensitive data.

The Notification Service can leverage the remote login functionality of the portal in order to provide basic authentication to RSS feeds. In one embodiment, feeds may not be protected individually therefore either none or all of the RSS feeds can require authorization.

The Notification Service can be able to provide a mechanism that can encapsulate the subscription information of a consuming application.

This type of encapsulation can allow for a separation of data for different consuming applications. In other words, a consuming application need not see subscription information for another consuming application using the same instance of the Notification Service.

The Notification Service can be able to store and retrieve all subscription-related information without any dependencies on the consuming application.

A separate, possibly embedded database, can be used to store the following types of information:

Subscriber information
Subscription information
  a. Type, object, RSS
Notification type per subscriber
Subscriptions to which Users are Subscribed The Notification Service can be able to dynamically add new subscription types for specific scenarios that consuming applications have.

Consuming applications can find the need to create a subscription with a type that is not offered by default. For example, it may want to support an event called "archiving." In order to accommodate those applications, the notification service can be able to add new types dynamically at runtime. The new types can be persisted and associated with subscriptions just like the built-in types are.

The Notification Service can be able to support multiple consuming applications in a single instance.

Multiple products may want to use the same instance of the notification service to prevent another server/install. The notification service can be able to manage subscriptions and send notifications for more than one instance of a product. The follow are scenarios that can be supported:

A single instance of an application.
  Two instances of the same application wanting to share the same subscription information.
  Two instances of the same application wanting to encapsulate their subscription information.

A heterogeneous environment where mixed applications want to encapsulate their own subscription information.

The Notification Service can be able to separate the content on a per consumer basis. However, the stored information need not be protected. Consumers can choose to request only their application's data set, or the data set of another application. To support unified management, all subscriptions across all products can be returned.

Consuming applications can be required to register in order to receive a context that can be used to identify their data when it is sent to the Notification Service. However, there need be no protected of content in order to facilitate a unified subscription management engine that can display all subscription/subscriber relationships across all registered consumers.

The Notification Service can be able to failover to another notification host if the current host is no longer reachable.

For SMTP email and groupware email, the notification service can be able to failover to another specified server if the current server is no longer reachable.

The Notification Service can provide information on that status of its health.

Health monitoring can include:
  Thread Health
  Database Health and Connectivity
  Remote Session Health The Notification Service can provide an asynchronous callback mechanism that can allow consuming applications to register a listener that can be notified of problems that occur inside of the Notification Service. However, the Notification Service can also provide a mechanism that can be queried periodically in the event that a consuming application wants to ensure that the entire component is operating correctly.

The Notification Service can provide a mechanism for a consumer to specify a template to use when the Notification Service is asked to generate content for a subscription update. The Notification Service can expect templates to be installed on an Image Server.

This can place responsibility of the consuming application to install a set of templates on the physical machine where the Notification Service is installed. The consuming application can need to know how to place templates in the correct location on the image server for the Notification Service to be able to pick them up. Templates that are not installed on the image server need not be supported.

The Notification Service can remove an RSS feed from the data storage layer when the subscription it is associated with has RSS turned off or is removed.

Turning off RSS publishing on a subscription can orphan many feeds and can begin to consume large amounts of space over time.

The Notification Service can provide a mechanism to empty all notification queues from a single point of access. IM, RSS and Email notification queues may have a backlog of messages that have been received, but not processed by the Notification Service.

The primary use case for this is when a notification has been pushed that can cause the relay system (IM, Email, etc) to timeout because of the processing required to transmit the notification. Administrators can use a JMX monitor to clear inbound message queues, if necessary.

The Notification Service can be able to provide a mechanism for restricting searches on subscriptions based on the following restriction types:
  Exact content match for subscription metadata
  Logical conjunction of 1 to n restrictions
  Logical disjunction of 1 to n restrictions
  AND, OR, and exact content matching for subscription metadata can allow client applications to leverage filtering subscription result sets to the point where the returned data is trimmed to the exact specifications of what the client needs.

The Notification Service can be able to display configuration information via a web-based graphical user interface (GUI).

The Notification Service can be able to provide a user interface that allows subscribers to manage all of their subscriptions across all of their applications in a single place.

The subscription management UI can leverage a security layer that authenticates the subscriber against the portal. This can couple the Notification Service to the portal security framework. Consuming applications can adhere to the user/security relationships used by the portal in order to have their information exposed via this interface.

The Notification Service can be able to asynchronously queue outgoing notifications to be processed in order to return control to the consuming application immediately.

A queue can exist for each type of notification that can be sent in order to return control immediately to the consuming application.

In one embodiment, the Notification Service can be able to send a single email in under the following times (in milliseconds):
  5 (ms) to an SMTP relay server
  40 (ms) to a groupware server A queue can exist for each type of notification that can be sent in order to return control immediately to the consuming application.

The Notification Service can support multiple concurrent updates to a single RSS feed without losing the data integrity of the feed.

The RSS feed functionality can be based on file locking that prevents multiple writes from causing a "last in wins" scenario. Alternatively, a database that supports transactions can be used to provide the same level of protection.

In order to provide content to international customers that use character sets incompatible with ASCII standard 7-bit encoding, encoded content that is CJK can be relayed with its integrity intact. In one embodiment, CJK content can be acceptable in the following areas of content for the Notification Service:

Recipient Names
Plaintext message content
HTML message content
RSS Feed content
IM message content In one embodiment, no installer is needed for the Notification Service 1.0. The Notification Service can be installed with whatever application consumes it.

One of the main features that the new notification component can include is the ability to be consumed by other products, not just collaboration. Notification technologies including E-mail, RSS, and Instant Messaging are various ways that other products may want to alert users of changes to data.

There are several implications of decoupling the notification component from collaboration. Without the collaboration database, the notification component can need to persist subscription information to a separate, stand-alone data source. A unified subscription schema can also now be required in order to support subscriptions for products that do not include the same type of user-to-object schema as collaboration.

The overall goal is to provide a generalized subscription management component that can be easily leveraged by several different applications at once. Consuming applications can be able to utilize the notification service as a way to manage subscriptions and provide notifications to end-users of events that occur within the system. The coupling between objects and subscriptions can be kept to a minimum in order to provide a solution that can fit the different products.

The Notification Service can be based on the ALUI Remoting framework and can therefore be exposed as a remote service through Spring dependency injection. Consuming applications that wish to use the Notification Service can need to be configured to use Spring and can need to have access to the remote Notification Service API.

The remote API can be delivered as a Java Archive (JAR) that can include data transfer objects and POJIs that provide for the remote invocation of Notification Service methods. Consuming applications that wish to leverage the Notification Service can include the component in their build process and ship with the remote API library.

Although designed as a generic component, the Notification Service can make assumptions about the consuming applications. Security services, subscriber information, and image server infrastructure can all be elements that couple the Notification Service to other products.

All subscription types can be able to leverage any of the notification technologies. A single subscription can be able to support RSS, IM, Email and any other notification form that is defined in the system:

Individual Items
  Consumers that identify the objects in their system with specific IDs can be able to easily create subscriptions that are based strictly on those objects.
Searches
  When the result set of a search result has changed, users can want to be notified. Searches generally do not have any well-defined means of identification. They are a collection of filter rules that are based around a starting point, such as a category or folder.
Listings
  Any type of view can be defined as a listing. In collaboration, a listing can be thought of as the view that is seen when looking at one of the portlets. There need be no specifically defined parameters or restrictions.
Concepts
  Generic events in a system, such as a new object created or a new user added, are similar the actions that can happen in individual items. However, because they are generic, they need not include any type of specific constraint, such as an ID.

A new unified subscription model can be responsible for allowing the above relationships to exist within the notification service. Additionally, it can be able to provide information on existing subscriptions, subscribed users and support further expansion of subscription types.

Administrators can map URLs to experience definition rules (XD) in order to provide multiple domains on a single portal server. Each "domain" can be branded individually to render a different visual experience to a customer.

Experience Definitions can be part of the generated content of a notification. Applications can be responsible for determining the content of a notification before the notification service can process the incoming message. The Notification Service can accept dynamic properties for each subscriber that can then be used to generate custom content. In one embodiment, the consuming application can retrieve the content pieces for each subscriber, but the Notification Service can combine the properties with a tokenized template to in order to generate the final content.

The data associated with experience definitions can be available to calling applications. Direct database calls and remote methods can provide the access points that can expose these new features. Applications can leverage this in order to generate the correct content before pushing a notification alert to the new notification service.

A benefit of running within the context of a web container is that the notification service can leverage the ability to expose functionality via servlets and JSP pages.

A web-based administration front-end that can provide access to the most commonly modified features of the notification service. The servlet can allow administrators to change properties of the notification service without the need to edit the config.xml file directly.

Authorization to the configuration servlet can be enforced by choosing a web container that has a lightweight, built-in mechanism for authenticating users. Choosing to use the web container's password protection can also decouple the notification service component from other products and provides the ability for a consumer that does not support the user-password paradigm to consume the service.

Figure 5A:
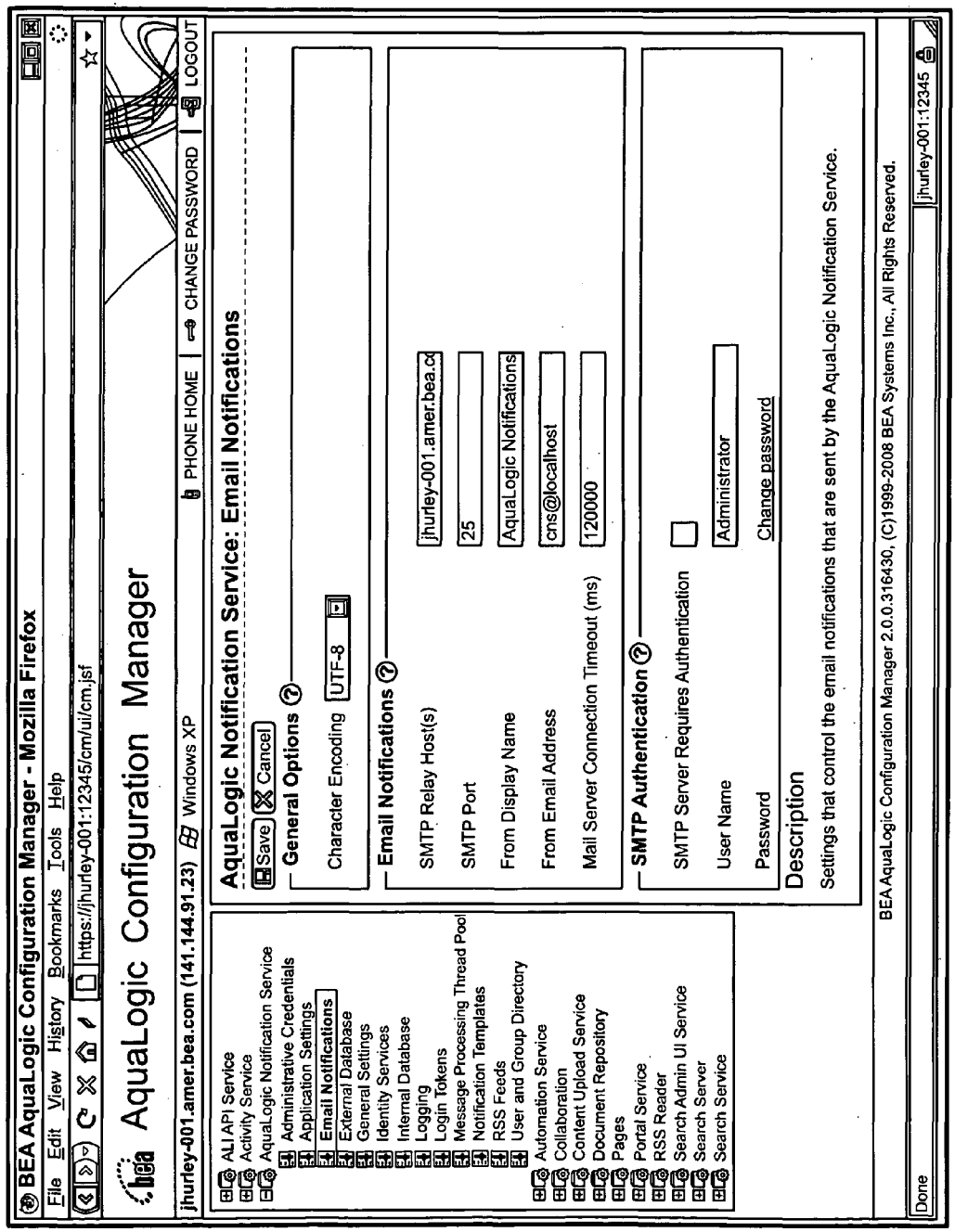
FIGS. 5A-5B show configuration pages for a Notification Service.
Figure 5B:
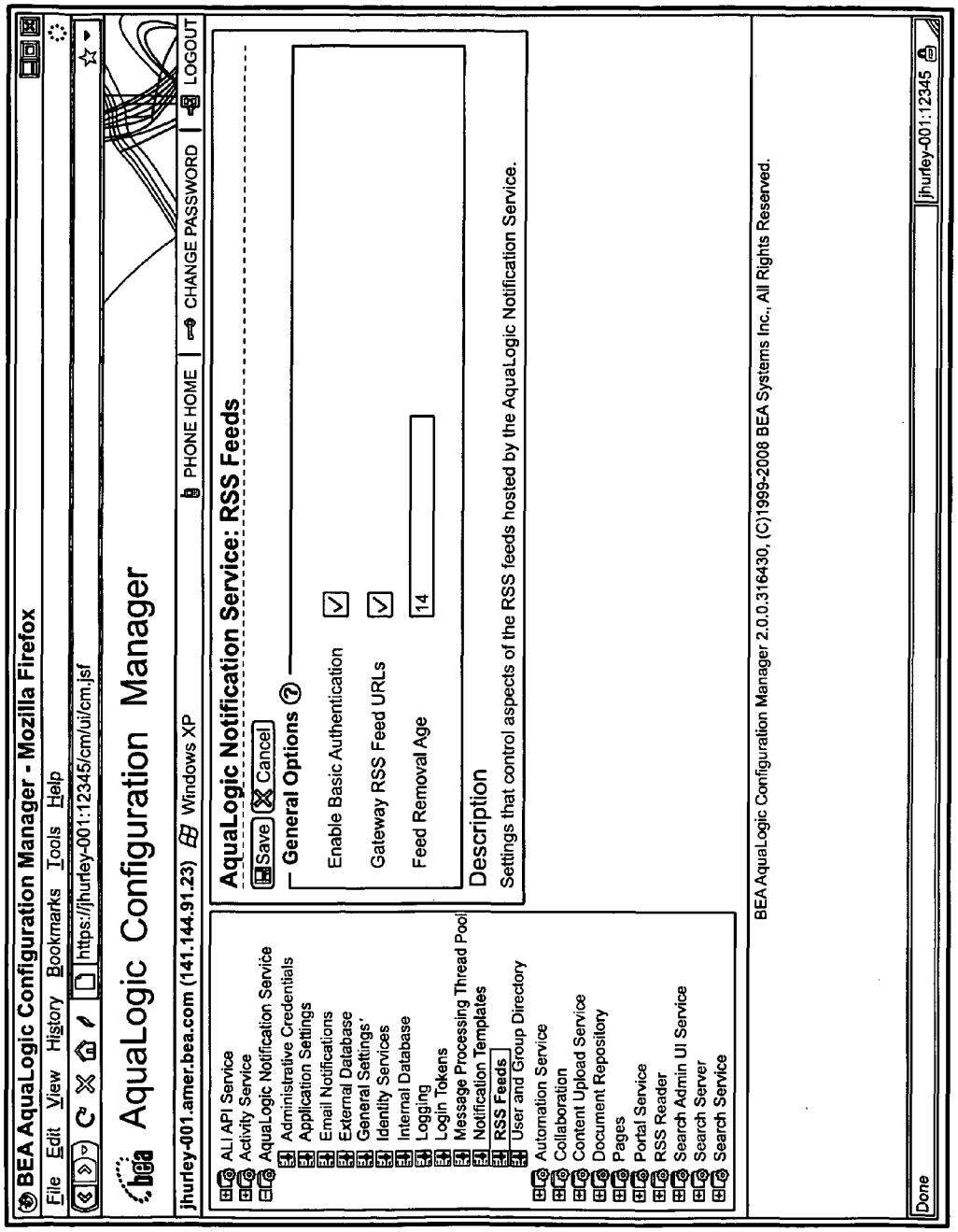

The following configuration properties of the notification service can be exposed via the configuration servlet.
  General Options can include:
  Enable/Disable Notification Service
  Enable/Disable Summary Notification Job
  Notification Service Time Zone
  Queue Time
  Email Options can include:
  Enable/Disable SMTP Relaying
  Email Sender Name
  Email Sender Address
  Email Hosts
  Accepted Domain List
  RSS Feed Options can include:
  Enable/Disable RSS Feeds
  Enable/Disable RSS Feed Authentication
  Maximum Age of Feed Items
  Total Number of Items per Feed FIGS. 5A and 5B illustrate exemplary configuration pages.

Client-side data validation can be performed before the page is submitted and the config.xml file modified. Integer fields can be tested for non-numeric characters.

Processing and sending emails can become the task of a background scheduler that can send emails in a timely manner while returning control to the main context of the notification service. Emails can be guaranteed to reach the SMTP relay server once they have been scheduled for delivery. In one embodiment, however, the order in which they can be delivered is strictly the responsibility of the scheduler.

In order to support a heterogeneous product environment by providing a unified subscription model, the notification service can persist subscription information independent of consuming applications.

In order to provide the least impact to system administrators while maintaining a level of performance that is acceptable, several open source and distributable database technologies can be leveraged. The ultimate goal of providing a bundled relational database is to minimize the cost of setting up a new notification service component. The following are abbreviated requirements for a bundled database:

Relational
Small downloadable footprint
Open Source
Embeddable in Java Programs
Transaction Support
Unicode Support The following exemplary database management systems meet the above stated requirements:

Apache Derby
HSQLDB
PostgreSQL

The notification service can provide a generic mechanism for subscriptions and notifications. The service component can need to maintain and manipulate the subscriptions that govern the rules of notifications.

Subscriptions can be comprised of several components which can define how each subscription remains unique from the next. The following are properties that can comprise each subscription:

Subscription Type
Subscription Object ID
Subscription Parameters
Subscription ID
RSS Enabled The subscription type is a way to identify the action that has occurred in order to trigger a notification for the event. In one embodiment, several default types can be used:

1. Item Creation
2. Item Deletion
3. Item Create or Delete
4. Item Update
5. General Create
6. General Delete
7. Saved Search Update
8. View Update Instead of creating a subclass for each type of notification, a new subscription type can be used instead. For example, to create a subscription that is used for alerting users that a new calendar event was created; the application can extend existing subscription types and create a new type named "Collaboration Event Creation".

The Subscription object ID can be an option field that might contain a unique integer that identifies an object in the client's system. Object IDs can be real IDs that exist in the content system, or they can simply be placeholders, such as −1. In the example above, Collaboration Application can use −1 as the value to indicate that the notification is not tied to any specific event object. When monitoring a document folder, the document folder ID can be used as the subscription's object ID.

Subscription parameters can mainly be used for things like views and saved searches (possibly restrictions).

The subscription ID can be a unique ID that is constructed from the various parts of the subscription. A subscription ID can be unique across consuming applications, even if the applications specify the exact same parameters for a specific subscription. This can ensure that multiple consumers can consume a single notification service.

RSS functionality can be enabled on a per-subscription basis. Each subscription can be updated to persist its information in an XML feed.

In one embodiment, there are only two notification types that are defined in the system. Notification types are ways in which a notification can reach a subscriber. Notification types need not expandable by the calling application since they require platform-specific implementations. "Email" and "Instant Messaging" can be the two delivery methods that are supported. Subscriptions are decoupled from notification types. This can enable subscribers to "mix and match" different methods of notification for a given subscription. Subscribers can be able to subscribe via multiple notification types to a single subscription.

The notification service component can provide a public contract, through its service oriented architecture, that can allow consuming applications to display subscription information on a per-user basis. This two-way architecture can also allow for individual users to change subscription types, view their current subscriptions, or unsubscribe from a resource.

The consuming application can be responsible for rendering the view that includes this information. The notification service can provide a mechanism that allows the consuming application to request the following sets of information:

For a given subscriber, retrieve all subscriptions including notification type
For a given subscription, retrieve all subscribers
Determine if a subscriber is to be notified for a given subscription In one embodiment, subscriber information is not be delivered by the consuming application, but instead pulled from a configurable data source. Since all consuming applications use the same pool of subscribers, this can eliminate the need for them to build in subscriber registration framework.

Instant delivery of notifications for a subscription update is not always the desired result for a given recipient. Subscribers can be allowed to delay the delivery of their subscriptions and be sent a summary of the data that has accumulated.

Delaying delivery of a subscription can be done so via the following approaches:

None: There is no delay so all notifications are delivered in real-time.
Hourly: The notification queued is emptied ever n hours.
Daily: The notification queue is emptied every 24 hours at a specified hour.
Daily Nth: The notification queue is emptied every n days at a specified hour.

Hourly delays can be started at the next occurrence of the hour marker; meaning that a delay set at 6:24 pm can fire starting at 7 pm. The subscriber can have the option of choosing the hour at which a daily and daily nth notification queue is emptied. "Every day at 3:00 PM" or "Every 4 days at 12:00 PM" are respective examples of this delay type.

In one embodiment, RSS notifications are not placed on a delay since they are coupled to the subscription and not part of the subscriber-subscription relationship. Additionally, RSS aggregators can be configurable to allow for period polling for updates to a feed. IM notifications need not be allowed to be sent as a summary due to the large amount of data that summaries may contain.

Example Scenario:

User1 has 4 subscriptions with the following notification types:
Project 123—Create/Delete—Email|Email Summary|IM
Folder 345—New Document Uploaded—Email|Email Summary
Discussion 888—New Message—Email Summary
Discussion 999—New Message—Email|IM User1 has specified that he would like a summary email sent to him every 8 hours. This can be configurable. Every time a message is sent to the Notification Service, it can check and see if it needs to save that message for delivery later for a summary subscription. 3 out of the 4 subscriptions above have the "Email Summary" notification type associated with it. So, although User1 also may want IM or regular instant email notification, on 3 of those, he can get a summary every 8 hours.

When the timer for User1 fires in the Notification Service, it can take all of the queued up messages for that user, and condense it down into a single email and send it.

The benefit of this mechanism is that a consuming application gets summary functionality for free. All that they need to do is expose the notification type "Email Summary". The Notification Service takes care of storing "what has happened" for each user and condenses the queued messages down to a single message when the timer fires.

However, this also means that the consuming application has no control over how the summary message looks. The Notification Service would have no idea how to condense the messages down into a different format. In this case, the consuming application may want to use the Notification Service to store information about summary subscriptions. The consuming application can use the Notification Service to retrieve all subscriptions for User1 that have the notification type "Email Summary" associated with it. It can also use the Notification Service to determine how to manage timers since the Notification Service can still store "how often" a user wants summaries. When the timer fires inside of the consuming application, it can figure out all that has happened since the last timer and generate the content for each subscriber. This is more work, but it also gives the consuming application the ability to format content in its own way.

A preferred method of emptying the queue is to condense the content into a single notification that can then be delivered. All of the content that existed in the queued notifications can be represented, but, in one embodiment, the subscriber can only receive one message via their preferred notification type.

Email Queue Example for subscriber with ID {0001}
Queue {0001}
  Notification-1
    content: A user has been added (user-1)
    sent: 1/1/2007 10:00 AM
  Notification-2
    content: The document, "Local Servers.xls" has been deleted.
    sent: 1/1/2007 10:32 AM
  Notification-3
    content: A user has been added (testUser01)
    sent: 1/1/2007 10:47 AM The message received by the subscriber would be similar to:
The following is a summary of queued notifications.
Date: 1/1/2007 10:00 AM
A user has been added (user-1)
Date: 1/1/2007 10:32 AM
The document, "Local Servers.xls" has been deleted.
Date: 1/1/2007 10:47 AM
A user has been added (testUser01)
—message end—

In order to accomplish this level of functionality, a JMS provider (such as activemq) and a timer management system (such as Quartz) can be leveraged. JMS provides an abstract mechanism for being able to queue "messages" and then empty (or process) the queue when ready. Quartz is a job management system that controls timers and can be used to alert the notification service when it is time to empty a queue.

As a result of the delay option for a subscriber, it can be necessary to store the delay information in the notification service's storage system. Depending on the job management framework chosen, this functionality can either need to be implemented independently, or can be included in the persistence layer of the chosen timer system. One benefit of using Quartz is that it integrates with an existing database and has the ability to store timer information.

In order to preserve the time zone information of the client, the hours that are set for a summary timer to expire on can be stored as the number of milliseconds since a fixed time, such as 1/1/1970 GMT. This can provide a way to store the hour of expiration independently from the time zone. All dates can be converted from GMT to the time zone of the system that the Notification Service is running on. When dates are sent back to the client, they are sent as a Java Date object, which can then be formatted with the time zone of the consuming application.

Instant messaging (IM) is another medium that can be used to deliver asynchronous notifications. Unlike other protocols, such as SMTP or RSS, instant messaging protocols do not guarantee delivery of the message. There are also unique restrictions such as message size, authentication options, and supported character sets. Despite the various drawbacks of instant messaging, it can be an acceptable solution, especially for a secondary means for notification delivery.

There are many instant messaging protocols and applications in existence today. An expandable framework can unify the common traits of all instant messaging systems. The WebLogic Personal Messaging API (WLPMAPI) can provide a framework that is designed as a solution to this problem. The customer application can use the IM schema backed by a provider implementation that supports the protocol desired.

Figure 6A:
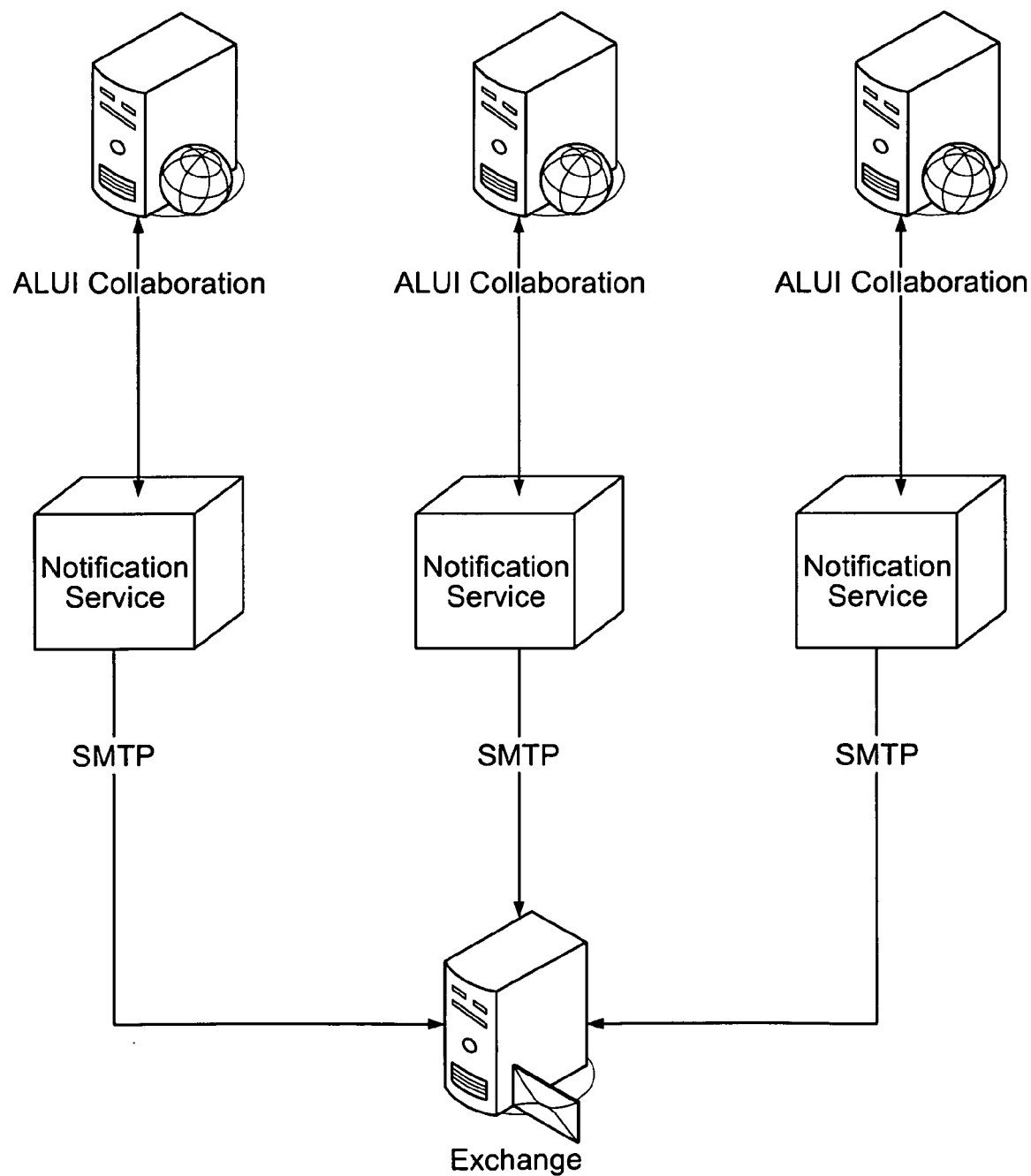
FIGS. 6A-6B illustrates one-to-one and one-to-many connections for a Notification Service.

WLPMAPI currently has existing support for the following protocols and connection methods:
Yahoo Instant Messaging (over HTTP and TCP)
Lotus Sametime via TCP A potential requirement for the new notification service is to allow multiple consumers the ability to use a single service instance. Current installations of ALUI Collaboration are comprised of a one-to-one relationship, as shown in FIG. 6A.

Figure 6B:
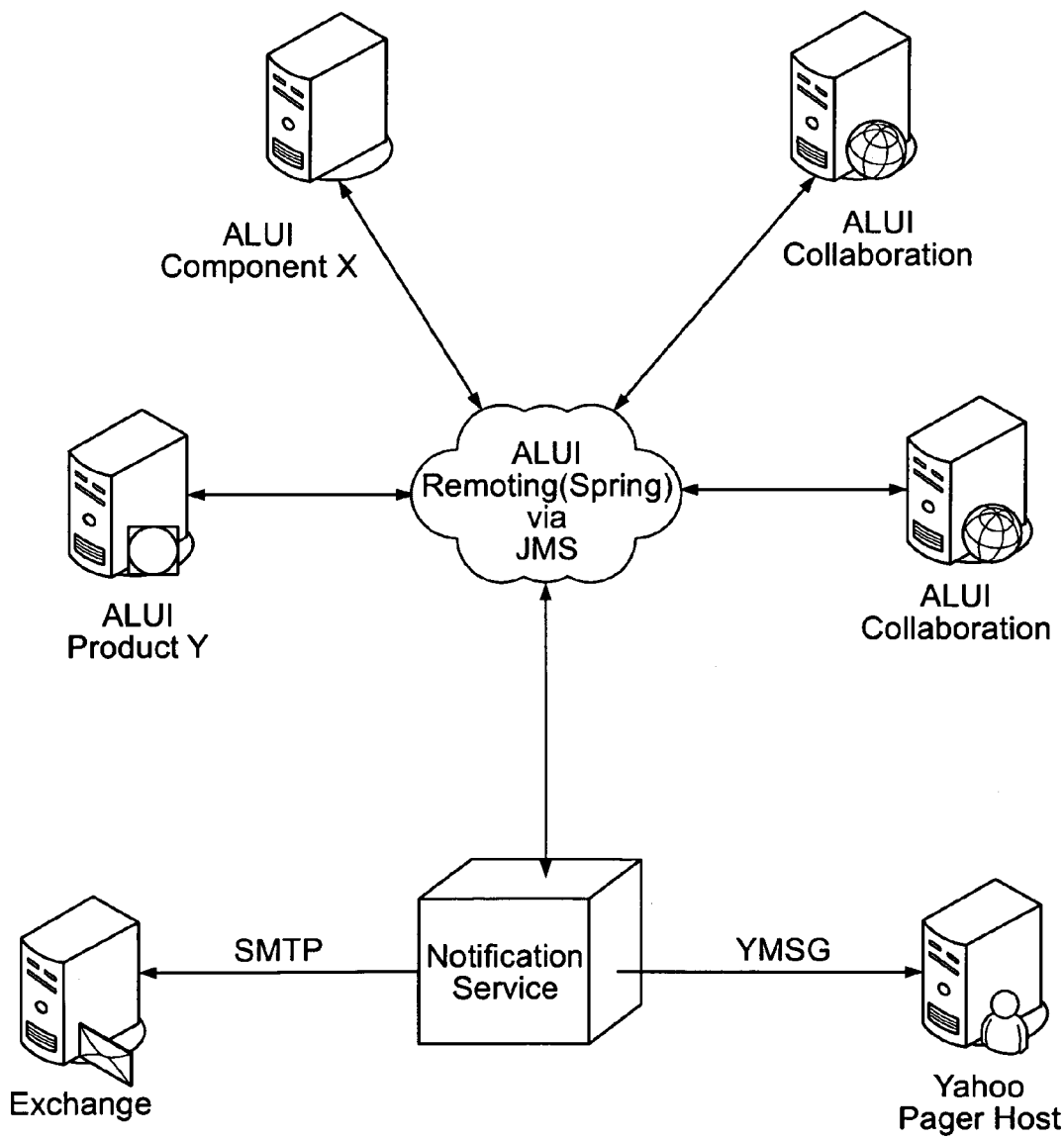

Although load factors may prevent multiple consumers from using the notification service, the architecture can be flexible enough to support a many-to-one relationship, as shown in FIG. 6B. As a result, the subscription data that the notification service stores can be unique for each consuming application. The consuming applications can be able to request a unique identifier that they can use as a token when making requests and queries. It can be the responsibility of the consuming application to maintain and store their unique identifier.

As a result of the sharing of the notification service between multiple consuming clients, the service can need to be able to differentiate between the requests of each individual product. The most common use case of this might be a single portlet that is deployed on two different servers. Each portlet can represent the same application, but a completely different instance of that application. The data for each instance can be encapsulated separately by the notification service.

Each consumer of the notification service can register and receive an authentication token before it is able to use the service. Registration can consist of simple properties, such as the name of the application and a password. The information can be stored by the notification service along with a unique identifier that is returned in the token to the caller. The registration and login system can mirror that of a traditional username/password setup.

Figure 7A:
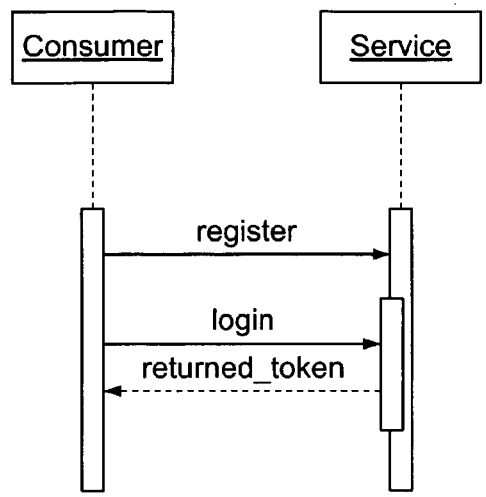
FIGS. 7A-7C illustrates examples of registration and log-on for a Notification Service.

FIG. 7A shows a simple consuming application registering and logging in.

Figure 7B:
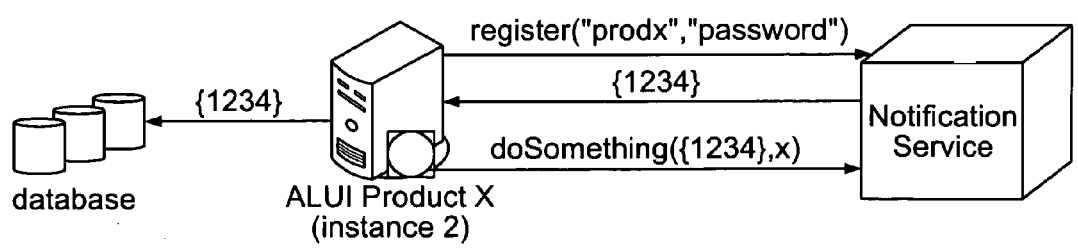

FIG. 7B shows Product X registering itself and then stores its unique ID. The ID is used to make unique requests. Without the ID, it may not be able to retrieve data it has already stored in the notification service.

Figure 7C:
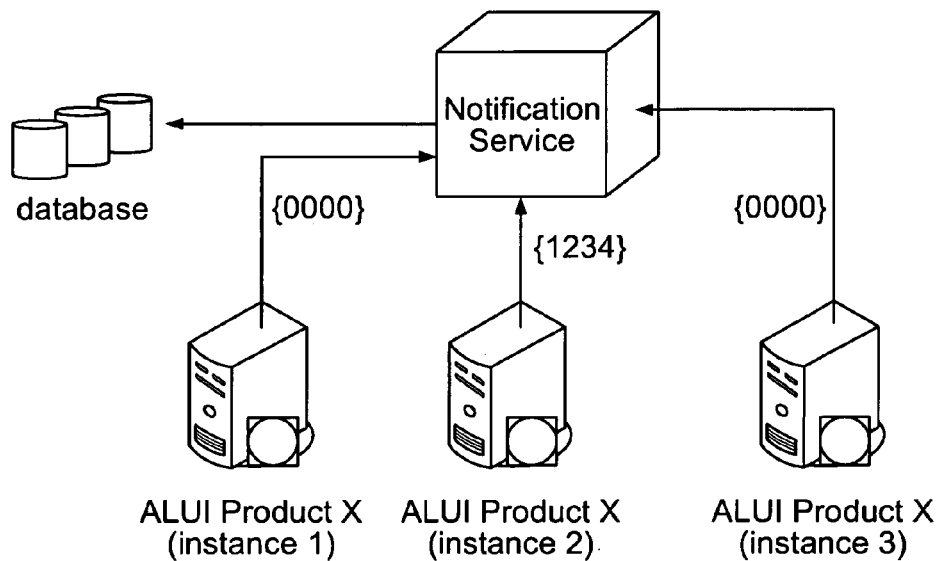

FIG. 7C shows instance 1 and instance 3 both are instances of the same product, but use the same identifier in order to have access to the same subscription information. Instance 2 is also an instance of the same product, but uses a different ID in order to encapsulate its data separately.

The notification service can depend on the availability of third-party SMTP relay mailers and need not include this functionality in its feature set. An alternative that provides a solution to this problem is to allow administrators to specify a series of SMTP relay servers. The notification service, when not able to locate the primary server, can move down the list of secondary servers until one can be reached.

A notification service can use the Apache Velocity engine to manage the templates that provide content for notifications. Adding new templates or modifying existing ones can require interaction with the notification service. Each notification that is sent to the service can know the filename of the template that can be used to generate the body content.

With the possibility of one notification service being consumed by multiple products, it can be necessary to either offer a remote template system, or to require that consumers manage their own content templates. Consumers choosing to manage their own templates can push pre-generated content associated with individual subscribers.

The Notification Service can also expose the ability for a consuming application to specify a tokenized template and a collection of properties that can be used by the Notification Service to generate dynamic content. The consuming applications can install templates on the Plumtree Image Server. When pushing the name of a template, the Notification Service can use a combination of the consuming application name (via the context) and the template filename to request the template text from the image server.

Once the Notification Service has acquired the template to use, it can generate the content based on properties provided by the consuming application. Properties can be common to be used for all subscribers, or can contain personal data, such as the last URL a subscriber used. Service-side dynamic content can be created for a subscription or a collection of recipients.

The current notification service can use a simplistic in-memory structure to store all messages that have been delivered to it by applications, but have not yet been processed. The queue size and poll time can be customizable via the notification service configuration file. Queued items can be manually pushed to the proper handlers by the notification service.

This approach can suffer from a volatile data flaw, where if the notification component goes down, all queued and unprocessed messages can be lost. Thus, the service cannot guarantee that queued messages can reach their destination.

The Java Messaging Service (JMS) is a specification for providing reliable message delivery. It is a middleware component for sending messages between two or more clients. JMS features a publish/subscribe model that allows multiple subscribed workers to receive a single queued message automatically. Messages are processed asynchronously, so the sending does not need to wait for delivery in order to continue. If the receiver is down the middleware component can store the messages on its behalf and can send them once it comes back up.

Figure 8:
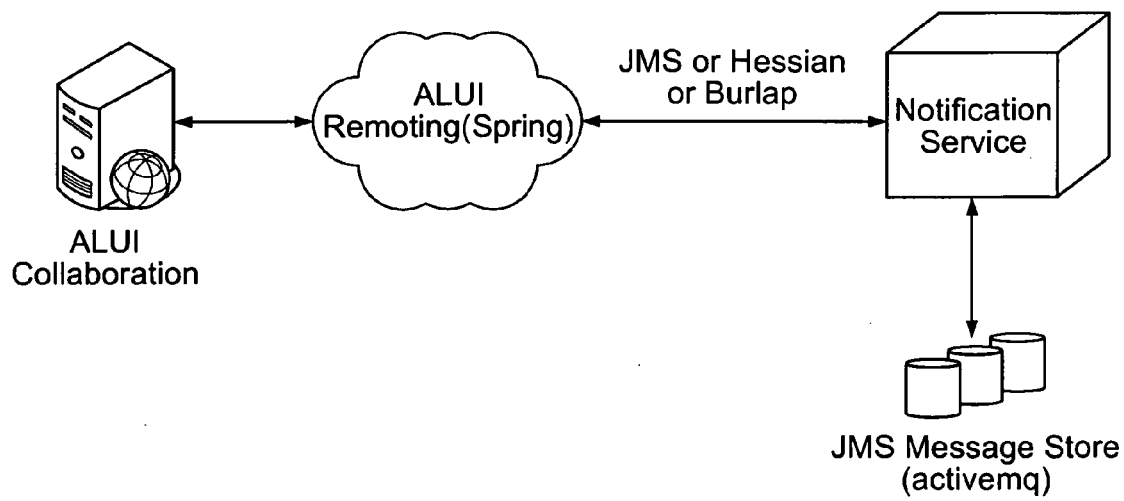
FIG. 8 illustrates the use of the spring framework to access JMS for a Notification Service.

FIG. 8 shows an example, where the Spring framework provides access to a Java Message Service (JMS) abstraction layer that simplifies the use of JMS by hiding the details of writing to the JMS API and all of the complexities of handling JMS resources. The abstraction layer can reduce the amount of boilerplate code that must be written for any JMS implementation as well as hides the API differences between version 1.02 and 1.1 of the JMS specification.

The Spring JDBC abstraction framework can provide a helpful set of utilities that can aid in creating an easily maintainable database interaction layer that is designed to solve these common problems.

Spring includes support for programming JDBC statements using named parameters, as opposed to programming JDBC statements using the classic placeholder, '?'. Connection management is handled by the framework and includes opening and closing database connections in order to reduce programmer error. Working with result sets has also become easier with the inclusion of lists that contain each row returned from a query.

Each subscriber within a consuming application can have an RSS feed associated with them. The feed can represent a summary of all of the updates that have occurred for all of the subscriptions they are subscribed to. The goal of the feed is to provide a single point of access to all of the changes that occur in a given application for the content that the subscriber has an interest in.

Subscriptions that do not have RSS enabled need not be published to the summary feed of a subscriber. In one embodiment, this restriction prevents summary feeds from including data that is not setup to be accessible via RSS. However, this also forces the summary feed to be a subset of all of the subscriptions that a user is subscribed to. If there are no feeds with RSS enabled, the summary feed can be empty.

In one embodiment, the health monitoring feature of the notification service can be currently exposed through a plain old java interface (POJI) via the Hessian protocol and need not follow any type of SOA paradigm. In order to decouple from this design and provide a common way for consuming applications to monitor the health of the notification service component, it makes sense to expose the health monitoring through the Spring remote services.

The responsibility can still remain with the client to periodically check the notification service for responsiveness and overall health and to determine the course of action to take. Multiple consumers of the service can detect that the service is down and can each handle the outage in their own manner. The client application can also be burdened with having the logic to detect when the service is back up and to begin regular monitoring again.

There are three technologies that can be used for job scheduler framework while also providing solutions for the above problems.

JDRing v2.0: An update to the currently implemented timer framework, the new version addresses some of the shortcomings of its predecessor.
- Advanced scheduling features allows for an expanded feature set of timer options, including hourly, monthly, daily, and seasonal.
- Current integration with the code base and database would stay mostly intact, minimizing the amount of changes that need to be made.
- Ability to spawn jobs in separate threads in order to create a concurrent scheduler.
- Source code can be directly integrated with ALI Collaboration and the notification service.
- No feedback from jobs and no way to interact with running jobs easily.
- No thread pooling.

Quartz: A full-featured, open source job scheduling system, Quartz can be integrated with the notification service to provide a feature-rich and performance-orientated timer mechanism.
- Distributes as JARs and source code providing two methods for integration.
- Contains an Oracle and SQL Server compatible persistence layer that would remove the burden from the notification service.
- Provides thread pooling mechanisms to remove the "one thread per timer" paradigm.
- Jobs can be dependant on each other before running.
- Jobs are capable of reporting back results and being queried during their runtime.
- Advanced scheduling features allows for an expanded feature set of timer options, including recurrence (x number of times, delayed), and on specific days.
- Spring supports Quartz as a job scheduler.

J2SE Timers: J2SE 5 includes timers that are build into the Java API.
- Lightweight and don't require any third-party applications.
- Advanced timer reporting and flexible functionality on the timers.
- Spring supports JDK Timers.
- We would need to modify our existing persistence layer to accommodate this form of timer.
- Supports "one-off" and recurring timers, as well as timers that occur on a specified date and time.

Quartz integrates well with Spring, and provide solutions to the existing feature requests while maintaining the current level of functionality that is offered today. The ability to persist its own data directly into a database also minimizes the amount of work that is needed to maintain timer state.

Data Transfer Objects (DTO) and interfaces that are exposed via the remote portion of the Notification Service API can be kept consistent when being developed for different platforms.

Contractual enforcement can be done by having those DTOs implement interfaces. These interfaces can be dynamically generated from an XML file that specifies method signatures. Data types used by those methods can be defined in a DTD. Public POJIs that are exposed via Spring can also be generated by this same process.

Figure 9:
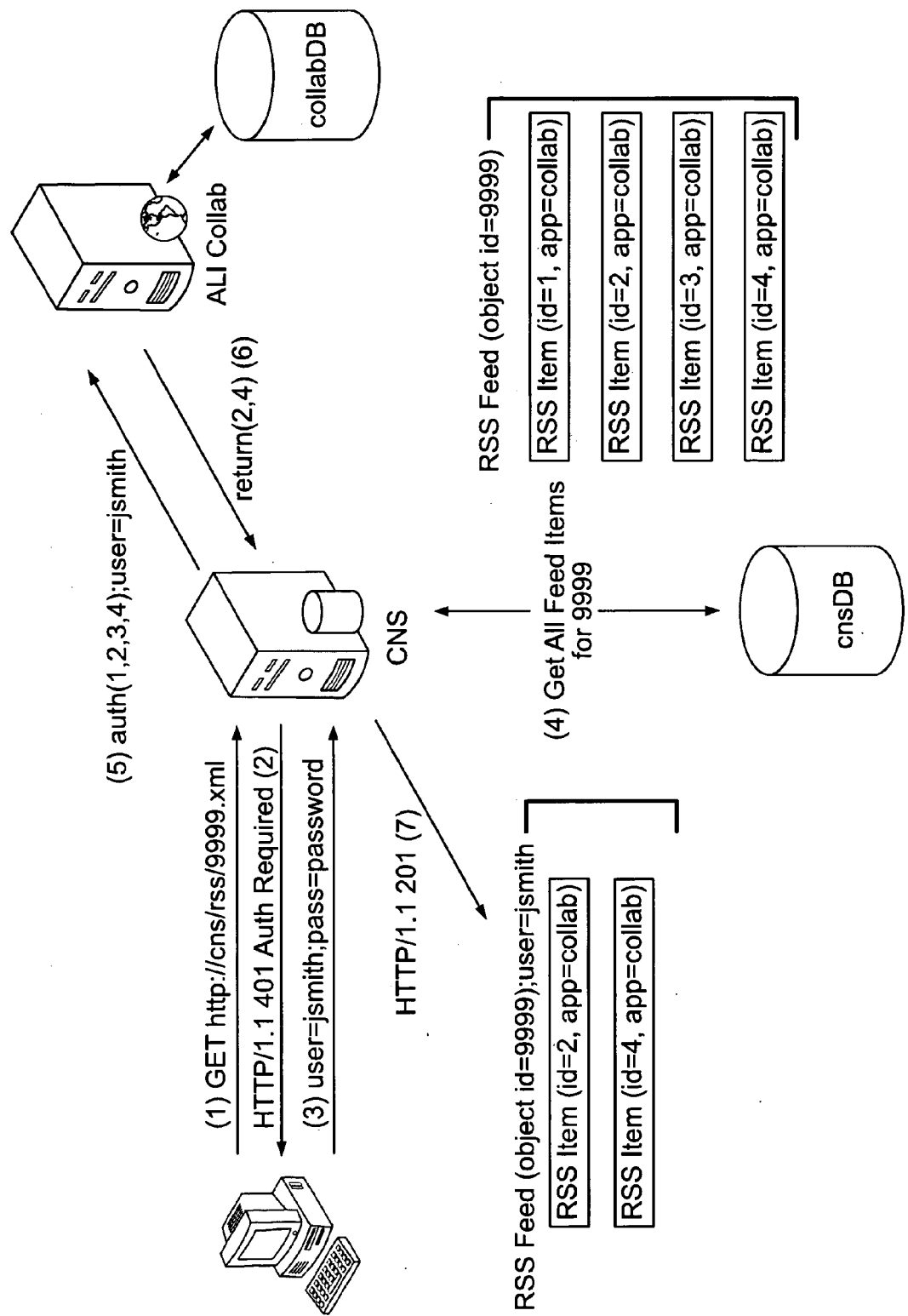
FIG. 9 shows RSS Feed Security of one embodiment.

FIG. 9 shows RSS Item Level Protection: Each item in an RSS feed knows about the object for which it describes and the object of the feed it is in. When a request is made, the Notification Service will request that the application responsible for that data filter the items based on user credentials. The resulting feed constructed in memory will be a natural subset of the original feed.

1. RSS aggregator requests feed
2. Notification Service servlet challenges for authentication
3. RSS aggregator supplies Base64 credentials and the Notification Service verifies them against ALUI Security
4. Notification Service scans its database for all items of the requested feed
5. Notification Service requests that a remote implementation filter the items based on their ID and the supplied user.
6. Remote implementation scans its internal security model and returns filtered items.
7. Notification Service constructs an in-memory feed of the filtered items and presents that data to the aggregator.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations can be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A computer based method for providing a notification service comprising:
    receiving, by a computer, events from one or more applications;
    interpreting, by the computer, the events to determine a plurality of users that should be sent notifications concerning the events;
    sending, by the computer, a notification to the plurality of users according to a format selected by the at least one of the users, the format selected from a set including email and Rich Site Summary (RSS);
    receiving, from a first user of the plurality of users, a time interval for receiving a report associated with the events at least in response to the notification;
    constructing, by the computer, the report associated with the events, the report configured to be provided as an RSS feed to the first user, the RSS feed comprising information indicating an occurrence of a type of event related to an object of the one or more applications, the type of the event in the RSS feed comprising at least one of a subscription update type or a search update type;
    sending, from the computer, the RSS feed to the first user of the plurality of users in accordance with the time interval;
    identifying, by the computer, a set of subscription types associated with the one or more applications, the set of subscription types comprising at least one of an item delete type, an item create type, a view update type, the subscription update type, or the search update type;
    receiving, by the computer, a request to search for content in a subscription associated with a subscription type in the set of subscription types, from at least the first user of the plurality of users; and
    providing, by the computer, the content associated with the subscription to at least the first user.

2. The computer based method for providing a notification service of claim 1, wherein at least one user of the plurality of users selects to receive the notification in a summary email.

3. The computer based method for providing a notification service of claim 2, wherein the at least one user selects the period of the summary email.

4. The computer based method for providing a notification service of claim 1, wherein the RSS notifications have user security.

5. The computer based method for providing a notification service of claim 4, wherein the RSS notifications use basic authentication with user name and password.

6. The computer based method for providing a notification service of claim 4, wherein the RSS notifications use tokens in a single sign on system.

7. The computer based method for providing a notification service of claim 1, wherein the notification service provides an Application Programming Interface (API) to receive from the one or more applications an association between the plurality of users, the object of the one or more applications, and a notification type associated with the notification, the notification type comprising at least one of the email or the RSS.

8. The computer based method for providing a notification service of claim 1, further comprising storing the objects in an associated database.

9. The computer based method for providing a notification service of claim 1, wherein an individualized user has a personal RSS feed giving all of the individual users notifications.

10. The method of claim 1, wherein the subscription update type indicates an update to subscription information associated with content to which the user of the application has subscribed.

11. The method of claim 10, wherein the subscription information comprises a subscription identifier associated with the subscription information.

12. The method of claim 10, wherein the subscription information comprises a subscription type associated with the subscription information.

13. The method of claim 10, wherein the subscription information comprises a notification type associated with the subscription information.

14. The method of claim 1, wherein the search update type indicates a change to at least a result set of a search result object related to the application.

15. The method of claim 1, further comprising:
    retrieving, by the computer, one or more subscribers associated with the subscription;
    retrieving, by the computer, a notification type associated with the subscription, the notification type comprising the format selected by at least the first user of the plurality of users to receive the notification; and
    providing, by the computer, via the report, the content associated with the subscription, information related to the one or more subscribers associated with the subscription, and information related to the notification type associated with the subscription, to at least the first user of the plurality of users.

16. A computer based method for providing a notification service comprising:
    receiving by a computer, events from one or more applications;

interpreting, by the computer, the events to determine a plurality of users that should be sent notifications concerning the events;

sending, by the computer, a notification to the plurality of users according to a format selected by the at least one of the users, the format selected from a set including email and Rich Site Summary (RSS);

receiving, from a first user of the plurality of users, a time interval for receiving a report associated with the events at least in response to the notification;

constructing, by the computer, the report associated with the events, the report configured to be provided as an RSS feed to the first user, the RSS feed comprising information indicating an occurrence of a type of event related to an object of the one or more applications, the type of the event in the RSS feed comprising at least one of a subscription update type or a search update type;

sending from the computer the RSS feed to the first user of the plurality of users in accordance with the time interval;

identifying, by the computer, a set of subscription types associated with the one or more applications, the set of subscription types comprising at least one of an item delete type, an item create type, a view update type, the subscription update type, or the search update type;

receiving, by the computer, a request to search for content in a subscription associated with a subscription type in the set of subscription types, from at least the first user of the plurality of users; and providing, by the computer, the content associated with the subscription to at least the first user.

17. The computer based method for providing a notification service of claim 16, wherein the notification service provides an Application Programming Interface (API) to receive from the one or more applications an association between the plurality of users, the object of the one or more applications, and a notification type associated with the notification, the notification type comprising at least one of the email or the RSS.

18. The computer based method for providing a notification service of claim 16, further comprising storing the objects in an associated database.

19. The computer based method for providing a notification service of claim 16, wherein an individualized user has a personal RSS feed providing all of the individual user's notifications.

20. A computer-readable memory having stored therein a sequence of instructions which, when executed by a processor, causes the processor to provide a notification service by:

receiving, by a computer, events from one or more applications;

interpreting, by the computer, the events to determine a plurality of users that should be sent notifications concerning the events;

sending, by the computer, a notification to the plurality of users according to a format selected by the at least one of the users, the format selected from a set including email and Rich Site Summary (RSS);

receiving, from a first user of the plurality of users, a time interval for receiving a report associated with the events at least in response to the notification;

constructing, by the computer, the report associated with the events, the report configured to be provided as an RSS feed to the first user, the RSS feed comprising information indicating an occurrence of a type of event related to an object of the one or more applications, the type of the event in the RSS feed comprising at least one of a subscription update type or a search update type;

sending, from the computer, the original RSS feed to the first user of the plurality of users in accordance with the time interval;

identifying, by the computer, a set of subscription types associated with the one or more applications, the set of subscription types comprising at least one of an item delete type, an item create type, a view update type, the subscription update type, or the search update type;

receiving, by the computer, a request to search for content in a subscription associated with a subscription type in the set of subscription types, from at least the first user of the plurality of users; and providing, by the computer, the content associated with the subscription to at least the first user.

21. The computer-readable memory of claim 20, wherein at least one user of the plurality of users selects to receive the notification in a summary email.

22. The computer-readable memory of claim 21, wherein the at least one user selects the period of the summary email.

23. The computer-readable memory of claim 20, wherein the RSS notifications have user security.

24. The computer-readable memory of claim 23, wherein the RSS notifications use basic authentication with user name and password.

25. The computer-readable memory of claim 23, wherein the RSS notifications use tokens in a single sign on system.

26. The computer-readable memory of claim 20, wherein the notification service provides an Application Programming Interface (API) to receive from the one or more applications an association between the plurality of users, the object of the one or more applications, and a notification type associated with the notification, the notification type comprising at least one of the email or the RSS.

27. The computer-readable memory of claim 20, further comprising storing the objects in an associated database.

28. The computer-readable memory of claim 20, wherein an individualized user has a personal RSS feed giving all of the individual users notifications.

29. A system comprising:

a processor; and a memory coupled with and readable by the processor and having stored therein a sequence of instructions which, when executed by the processor, cause the processor to provide a notification service by receiving, by a computer, events from one or more applications, interpreting, by the computer, the events to determine a plurality of users that should be sent notifications concerning the events, receiving, from a first user of the plurality of users, a time interval for receiving a report associated with the events at least in response to the notification, constructing, by the computer, the report associated with the events, the report configured to be provided as a Rich Site Summary (RSS) feed to the first user, the RSS feed comprising information indicating an occurrence of a type of event related to an object of the one or more applications, the type of the event in the RSS feed comprising at least one of a subscription update type or a search update type, sending, from the computer, the RSS feed to the first user of the plurality of users in accordance with the time interval, identifying, by the computer, a set of subscription types associated with the one or more applications, the set of subscription types comprising at least one of an item delete type, an item create type, a view update type, the subscription update type, or the search update type, receiving, by the computer, a request to search for content in a subscription associated with a subscription type in the set of subscription types, from at least the first user of the plurality of users and providing, by the computer, the content associated with the subscription to at least the first user.

30. The system of claim 29, wherein the notification service provides an Application Programming Interface (API) to receive from the one or more applications an association between the plurality of users, the object of the one or more applications, and a notification type associated with the notification, the notification type comprising at least one of the email or the RSS.

31. The system of claim 29, further comprising storing the objects in an associated database.

32. The system of claim 29, wherein an individualized user has a personal RSS feed providing all of the individual user's notifications.

* * * * *

UNITED STATES PATENT AND TRADEMARK OFFICE
CERTIFICATE OF CORRECTION

| | |
|---|---|
| PATENT NO. | : 9,734,487 B2 |
| APPLICATION NO. | : 12/208032 |
| DATED | : August 15, 2017 |
| INVENTOR(S) | : Arconati et al. |

It is certified that error appears in the above-identified patent and that said Letters Patent is hereby corrected as shown below:

On the Title Page

On page 2, Column 2, under Other Publications, Line 19, delete "Mircosoft," and insert
-- Microsoft, --, therefor.

In the Specification

In Column 4, Line 61, after "system" insert -- . --.

Signed and Sealed this
Twenty-second Day of May, 2018

Andrei Iancu
*Director of the United States Patent and Trademark Office*